(12) United States Patent
Alex et al.

(10) Patent No.: US 7,940,021 B2
(45) Date of Patent: May 10, 2011

(54) MOTOR SENSING CIRCUIT WITH TRANSIENT VOLTAGE SUPPRESSION

(75) Inventors: Horng Alex, Kaohsiung (TW); Lin Hsing-Nan, Kaohsiung (TW); Wu Kun-Tien, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 289 days.

(21) Appl. No.: 12/258,870

(22) Filed: Oct. 27, 2008

(65) Prior Publication Data
US 2009/0189554 A1    Jul. 30, 2009

(30) Foreign Application Priority Data
Jan. 28, 2008   (TW) ................ 97103136 A

(51) Int. Cl.
*H02P 7/00* (2006.01)

(52) U.S. Cl. ............ 318/432; 361/23; 361/91.5

(58) Field of Classification Search ......... 361/23, 361/30, 31, 33, 91.1, 91.2, 91.5, 91.6; 318/432
See application file for complete search history.

(56) References Cited

U.S. PATENT DOCUMENTS

| | | | |
|---|---|---|---|
| 4,368,412 A | | 1/1983 | Inoue |
| 5,532,635 A | * | 7/1996 | Watrous et al. ............... 327/310 |
| 5,867,001 A | | 2/1999 | Lagerquist et al. |
| 5,875,087 A | * | 2/1999 | Spencer et al. ................ 361/87 |
| 6,975,493 B2 | * | 12/2005 | Strayer et al. .................. 361/56 |
| 6,992,524 B2 | * | 1/2006 | Yang et al. .................... 327/540 |
| 7,408,755 B1 | * | 8/2008 | Ye et al. ....................... 361/93.1 |
| 2007/0121257 A1 | * | 5/2007 | Maitra et al. ..................... 361/2 |

* cited by examiner

*Primary Examiner* — Rina I Duda
(74) *Attorney, Agent, or Firm* — Muncy, Geissler, Olds & Lowe, PLLC

(57) ABSTRACT

A motor sensing circuit with transient voltage suppression includes a sensing unit and an impulse absorber. The sensing unit has an electrical switch generating a pulse sensing signal when switching and a signal output terminal electrically connecting to the electrical switch and outputting said pulse sensing signal. The impulse absorber has a first terminal connecting to the signal output terminal of the sensing unit and a second terminal being grounded. Consequently, the impulse absorber is able to provide a route for a transient current to be drained away, with the transient current being generated by an impulse inputted the motor sensing circuit through the signal output terminal.

17 Claims, 2 Drawing Sheets

MOTOR SENSING CIRCUIT WITH TRANSIENT VOLTAGE SUPPRESSION

BACKGROUND OF THE INVENTION

1. Field of the Invention

The present invention relates to a motor sensing circuit, and more particularly to a motor sensing circuit with transient voltage suppression to suppress transient voltage inputted from a signal output terminal thereof.

2. Description of the Related Art

A conventional motor sensing circuit 9 of a motor driver circuit is shown in FIG. 1. The conventional motor sensing circuit 9 includes an electrical switch 90 and a signal output terminal 91 for outputting a sensing signal. Said signal output terminal 91 is preferably selected from a sensing port of the motor driver circuit, such as a FG (frequency generation) pin or a RD (rotation detection) pin of a motor driver IC of the motor driver circuit.

However, in order to avoid distortion of the sensing signal that is generally a signal of sine wave, a conventional way to bypass a high transient voltage that is caused by a lightening stroke or electrostatic discharge through a bypass capacitor is not usable. Thus, the motor driver circuit is vulnerable when an impulse inputs the motor driver circuit through the signal output terminal 91 of the motor sensing circuit 9. Accordingly, there is a need for redesigning the conventional motor sensing circuit.

SUMMARY OF THE INVENTION

The primary objective of this invention is to provide a motor sensing circuit with transient voltage suppression to enhance the operation stability of the motor sensing circuit.

The secondary objective of this invention is to provide the motor sensing circuit with transient voltage suppression to prevent a motor driver circuit with the motor sensing circuit from damages caused by an impulse inputted from a signal output terminal thereof.

In accordance with an aspect of the present invention, the motor sensing circuit with transient voltage suppression includes a sensing unit and an impulse absorber. The sensing unit has an electrical switch generating a pulse sensing signal when switching and a signal output terminal electrically connecting to the electrical switch and outputting said pulse sensing signal. The impulse absorber has a first terminal connecting to the signal output terminal of the sensing unit and a second terminal being grounded. Consequently, the impulse absorber is able to provide a route for a transient current to be drained away, with the transient current being generated by an impulse inputted the motor sensing circuit through the signal output terminal.

In accordance with another aspect of the present invention, the motor sensing circuit with transient voltage suppression further includes a current limit resister provided and connected between the first terminal of the impulse absorber and the electrical switch of the sensing unit.

In accordance with another aspect of the present invention, the motor sensing circuit with transient voltage suppression further includes a current limit resister, with the first terminal of the impulse absorber connecting to the signal output terminal of the sensing unit through the current limit resister.

In accordance with another aspect of the present invention, the impulse absorber of the motor sensing circuit with transient voltage suppression is a Zener diode providing a cathode as the first terminal and an anode as the second terminal and having a breakdown voltage value greater than a voltage level of a source voltage provided by a power source connecting to the signal output terminal.

Further scope of the applicability of the present invention will become apparent from the detailed description given hereinafter in connection with drawings. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter, and the accompanying drawings that are given by way of illustration only are not limitations of the present invention, wherein.

Figure 2:
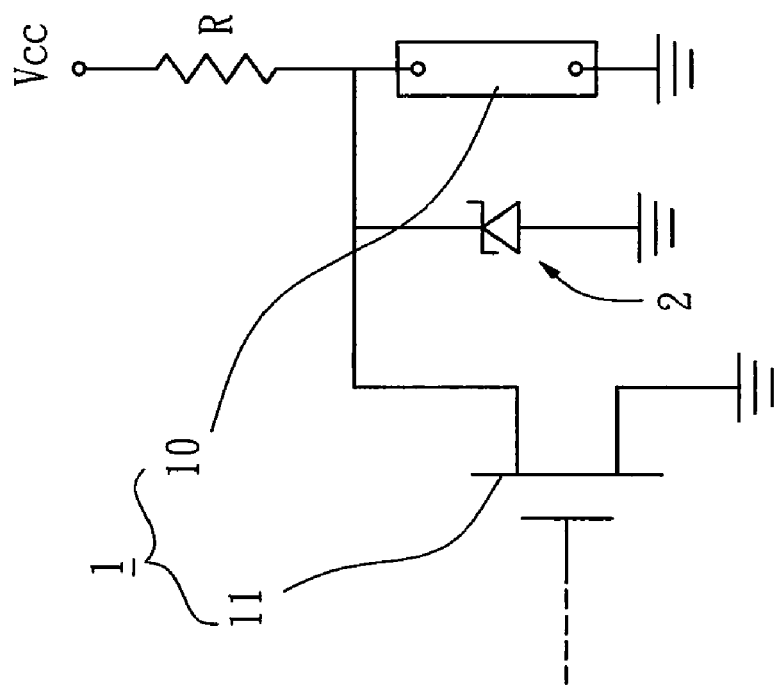
FIG. 2 is a circuit pattern of a motor sensing circuit with transient voltage suppression in accordance with a first embodiment.
Figure 1:
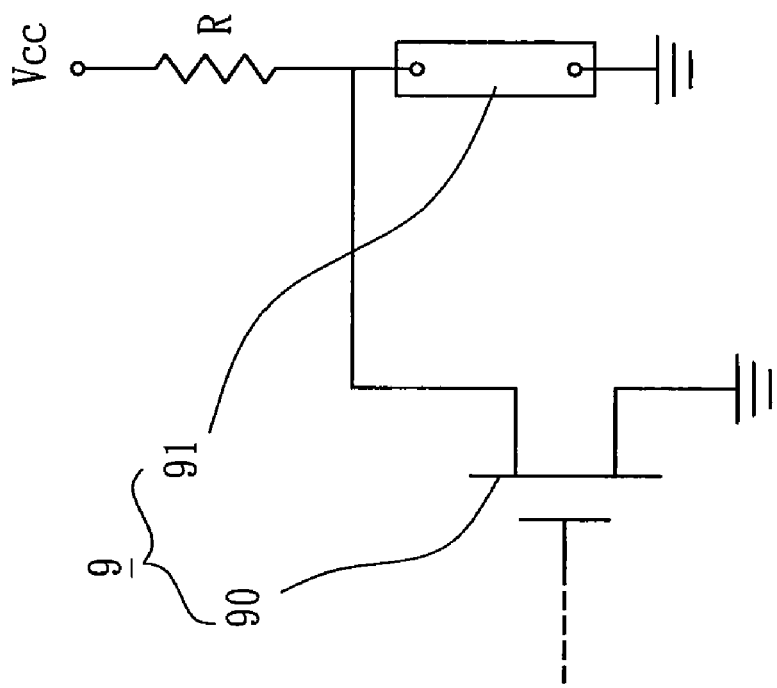
FIG. 1 is a circuit pattern of a conventional motor sensing circuit.

In the various figures of the drawings, the same numerals designate the same or similar parts. Furthermore, when the terms "first", "second", "third" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Referring now to FIG. 2, a first embodiment of a motor sensing circuit with transient voltage suppression is shown, which includes a sensing unit 1 and an impulse absorber 2. The sensing unit 1 has a signal output terminal 10 that is preferably formed by a sensing port of a motor driver circuit having the motor sensing circuit, and an electrical switch 11 generating a pulse sensing signal when switching, with the signal output terminal 10 outputting the pulse sensing signal generated by the electrical switch 11. Namely, when the motor driver circuit is utilized to control a motor, the electrical switch 11 switches correspondingly to operation information of a motor such as position or velocity of the motor and generates and transfers the pulse sensing signal to the signal output terminal 10. Therefore, a designer or user can be informed of information about the motor. Besides, the signal output terminal 10 electrically connects to a power source VCC through a resister R, so that a high-level output voltage of the pulse sensing signal is at a voltage level equal to that of a source voltage provided by the power source VCC.

Still referring to the FIG. 2, in the first embodiment of the present invention, a Zener diode is utilized as the impulse absorber 2, with a first terminal of the impulse absorber 2 connecting to the signal output terminal 10 of the sensing unit 1 and a second terminal thereof being grounded. In detail, in the first embodiment, the Zener diode applied as the impulse absorber 2 connects with the signal output terminal 10 in parallel, with the Zener diode providing a cathode as the first terminal electrically and directly connecting with a node between the resister R and the signal output terminal 10 and also providing an anode as the second terminal being grounded. Moreover, the Zener diode has a breakdown voltage value greater than the voltage level of the source voltage. And thereby, the impulse absorber 2 is able to maintain a regular operation of the sensing unit 1 and suppress transient voltage inputted into the motor sensing circuit through the signal output terminal 10 to protect the whole motor sensing circuit.

The operation of the first embodiment is further illustrated as the following. In a regular operation of the motor sensing circuit, owing to the selected Zener diode with the breakdown voltage value higher than the voltage level of the source voltage, the pulse sensing signal with the high-level output voltage at the voltage level of the source voltage will not be affected by the Zener diode. Namely, there is no current passing through the impulse absorber 2 when only the pulse sensing signal is transferred to the signal output terminal 10, and thus distortion of the pulse sensing signal is avoided. On the contrary, when an impulse inputs the motor sensing circuit through the signal output terminal 10 and builds a transient voltage with a high voltage level such as of thousands of volts, the impulse absorber 2 of Zener diode will be actuated. In detail, the transient voltage with a value larger than the breakdown voltage value of the Zener diode will generate a transient current, namely a breakdown current of the Zener diode, flowing through the Zener diode. Consequently, the motor sensing circuit is protected from damages caused by the impulse since the impulse absorber 2 quickly builds a route for the transient current, such as the breakdown current, to be drained away.

Figure 3:
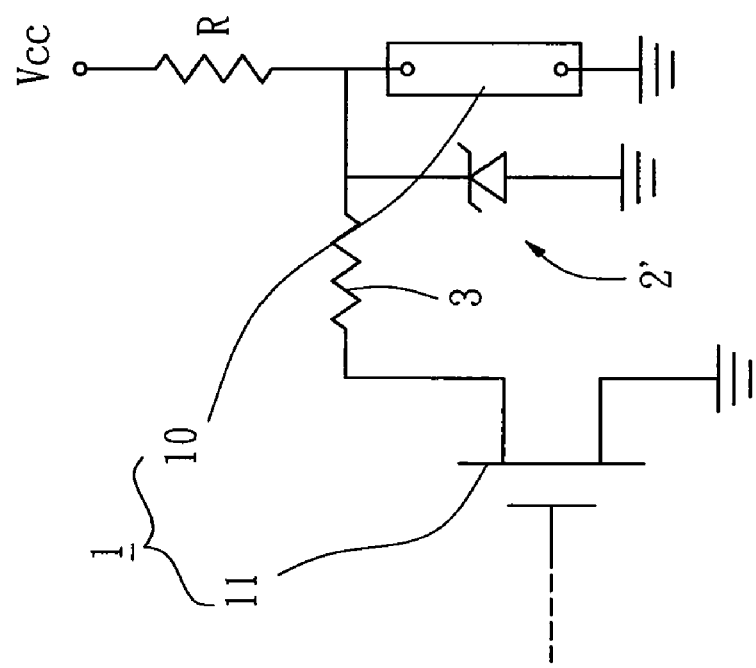
FIG. 3 is a circuit pattern of a motor sensing circuit with transient voltage suppression in accordance with a second embodiment.

Turning to the FIG. 3, a second embodiment of a motor sensing circuit with transient voltage suppression is shown. In comparison with the impulse absorber 2 constructed by the Zener diode in the first embodiment, another impulse absorber 2' selected from a transient voltage suppressor (TVS) is applied. The operation of the impulse absorber 2' is similar to that of the impulse absorber 2 in the first embodiment; however, a voltage level that the impulse absorber 2' of TVS can bear is higher than that provided by the impulse absorber 2 of Zener diode.

Furthermore, a current limit resister 3 is used in the second embodiment for a first terminal of the impulse absorber 2', by which the impulse absorber 2' connects with the node between the resister R and the signal output terminal 10, to connect with the electrical switch 11 through the current limit resister 3. And thereby a current flowing through the electrical switch 11 can be controlled. Namely, when the electrical switch 11 is in on-state in a regular operation of the motor sensing circuit, the source power generates the current flowing through the resister R, the current limit resister 3 and the electrical switch 11 and to the ground in sequence. Thus, the current generated by the source power can be adjusted by varying the resistance of the current limit resister 3.

Figure 4:
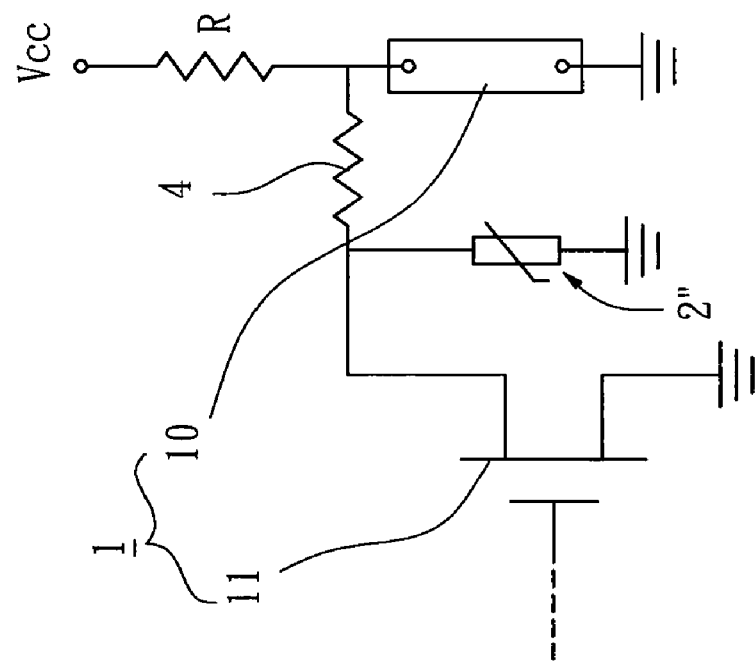
FIG. 4 is a circuit pattern of a motor sensing circuit with transient voltage suppression in accordance with a third embodiment.

Referring FIG. 4 now, a third embodiment of a motor sensing circuit with transient voltage suppression is shown. In comparison with the impulse absorbers 2, 2' constructed by Zener diode and TVS in the first and second embodiments, further another impulse absorber 2" selected from a varistor is applied, with the varistor providing a varistor voltage value larger than the voltage level of the source voltage.

Moreover, another current limit resister 4 is used in the third embodiment for a first terminal of the impulse absorber 2" to connect to the node between the resister R and the signal output terminal 10 through said current limit resister 4. The current limit resister 4 can not only control the current flowing through the electrical switch 11, but also limit a current flowing through the impulse absorber 2", so as to prevent the electrical switch 11 and impulse absorber 2 from damages resulted from large currents. The detailed operation of the motor sensing circuit in the third embodiment is illustrated as the following.

When the motor sensing circuit is under a regular operation, owing to the pulse sensing signal with the high-level output voltage lower than the varistor voltage value of the varistor as the impulse absorber 2", the impulse absorber 2" is not actuated by the pulse sensing signal, and thus said pulse sensing signal will not be affected by the impulse absorber 2". Besides, the current flowing through the electrical switch 11 is adjustable by varying the resistance of the current limit resister 4. On the contrary, when an impulse inputs the motor sensing circuit through the signal output terminal 10 and builds a transient voltage with a high voltage level such as of thousands of volts that is higher than the varistor voltage value, the impulse absorber 2" will be actuated and guide a transient current generated by the transient voltage to the earth. Consequently, the motor sensing circuit is protected from damages caused by the transient voltage since the impulse absorber 2" formed by the varistor also quickly builds a route for the transient current to be drained away. Besides, because the transient current initially passes through the current limit resister 4 before passing through the impulse absorber 2", the transient current is further limited.

In comparison with the conventional motor sensing circuit, the present invention provides the impulse absorbers 2, 2', 2" connecting to the node between the resister R and the signal output terminal 10, which can build the route for the transient current to be drained away when the transient voltage is built, so as to enhance the stability of the operation of the motor sensing circuit and prevent the motor driver circuit from damages caused by the impulse.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A motor sensing circuit with transient voltage suppression, comprising:
   a sensing unit having an electrical switch generating a pulse sensing signal when switching and a signal output terminal electrically connecting to the electrical switch and outputting said pulse sensing signal;
   an impulse absorber having a first terminal connecting to the signal output terminal of the sensing unit and a second terminal being grounded; and
   a current limit resister connected between the first terminal of the impulse absorber and the electrical switch of the sensing unit;
   wherein the impulse absorber is for providing a route for a transient current to be drained away, with the transient current being generated by an impulse inputted the motor sensing circuit through the signal output terminal.

2. The motor sensing circuit as defined in claim 1, wherein the first terminal of the impulse absorber directly connects with the signal output terminal of the sensing unit.

3. The motor sensing circuit as defined in claim 1, wherein the signal output terminal connected to a power source through a resister.

4. The motor sensing circuit as defined in claim 3, wherein the impulse absorber is a Zener diode, with the Zener diode providing a cathode as the first terminal electrically and directly connecting with the signal output terminal and an anode as the second terminal being grounded.

5. The motor sensing circuit as defined in claim 4, wherein the Zener diode has a breakdown voltage value greater than a voltage level of a source voltage provided by the power source.

6. The motor sensing circuit as defined in claim 3, wherein the impulse absorber is a transient voltage suppressor.

7. The motor sensing circuit as defined in claim 3, wherein the impulse absorber is a varistor.

8. The motor sensing circuit as defined in claim 7, wherein the varistor providing a varistor voltage value larger than a voltage level of a source voltage provided by the power source.

9. The motor sensing circuit as defined in claim 1, wherein the signal output terminal is formed by a sensing port of a motor driver circuit having the motor sensing circuit.

10. A motor sensing circuit with transient voltage suppression, comprising:
   a sensing unit having an electrical switch generating a pulse sensing signal when switching and a signal output terminal electrically connecting to the electrical switch and outputting said pulse sensing signal;
   an impulse absorber having a first terminal connecting to the signal output terminal of the sensing unit and a second terminal being grounded; and
   a current limit resister connected between the first terminal of the impulse absorber and the signal output terminal of the sensing unit;
   wherein the impulse absorber is for providing a route for a transient current to be drained away, with the transient current being generated by an impulse inputted the motor sensing circuit through the signal output terminal.

11. The motor sensing circuit as defined in claim 10, wherein the signal output terminal connected to a power source through a resister.

12. The motor sensing circuit as defined in claim 11, wherein the impulse absorber is a Zener diode, with the Zener diode providing a cathode as the first terminal electrically and directly connecting with the signal output terminal and an anode as the second terminal being grounded.

13. The motor sensing circuit as defined in claim 12, wherein the Zener diode has a breakdown voltage value greater than a voltage level of a source voltage provided by the power source.

14. The motor sensing circuit as defined in claim 11, wherein the impulse absorber is a transient voltage suppressor.

15. The motor sensing circuit as defined in claim 11, wherein the impulse absorber is a varistor.

16. The motor sensing circuit as defined in claim 15, wherein the varistor providing a varistor voltage value larger than a voltage level of a source voltage provided by the power source.

17. The motor sensing circuit as defined in claim 10, wherein the signal output terminal is formed by a sensing port of a motor driver circuit having the motor sensing circuit.

* * * * *